United States Patent Office 3,517,069
Patented June 23, 1970

3,517,069
PROCESSES FOR PREPARING 4-(LOWER ALKOXY)-4'-TRIFLUORO-METHYLBIPHENYLS
Frederick Louis Bach, Montvale, N.J., and Elliott Cohen and Philip John Kohlbrenner, Pearl River, N.Y., assignors to American Cyanamid Company, Stamford, Conn., a corporation of Maine
No Drawing. Filed May 13, 1968, Ser. No. 728,844
Int. Cl. C07c 43/20
U.S. Cl. 260—612         5 Claims

ABSTRACT OF THE DISCLOSURE

This disclosure describes processes for the preparation of 4-(lower alkoxy)-4'-trifluoromethylbiphenyls by the aromatization of the corresponding 1-(4'-trifluoromethylphenyl)-4-(lower alkoxy)-1-cyclohexenes.

BRIEF SUMMARY OF THE INVENTION

This invention relates to new processes for producing 4-(lower alkoxy)-4'-trifluoromethylbiphenyls and, more particularly, is concerned with novel aromatization processes for converting 1-(4'-trifluoromethylphenyl)-4-(lower alkoxy)-1-cyclohexenes to the corresponding 4-(lower alkoxy)-4'-trifluoromethylbiphenyls as set forth in the following reaction scheme:

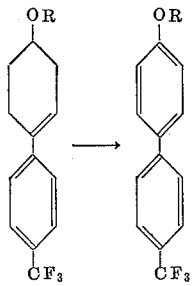

wherein R is lower alkyl. Suitable lower alkyl groups contemplated by the present invention are those having up to 4 carbon atoms such as methyl, ethyl, n-propyl, isopropyl, n-butyl, isobutyl, sec.-butyl and tert.-butyl.

DETAILED DESCRIPTION OF THE INVENTION

Specific starting materials operable in the novel aromatization processes of the present invention include, for example, 1 - (4' - trifluoromethylphenyl)-4-methoxy-1-cyclohexene, 1-(4'-trifluoromethylphenyl)-4-ethoxy-1-cyclohexene, 1 - (4'-trifluoromethylphenyl)-4-isopropoxy-1-cyclohexene, 1 - (4'-trifluoromethylphenyl)-4-sec.-butoxy-1-cyclohexene, and the like.

The 1 - (4'-trifluoromethylphenyl)-4-(lower alkoxy)-1-cyclohexenes, the starting materials for the novel aromatization processes of the present invention, may be readily prepared from the corresponding 1-(4'-trifluoromethylphenyl)-4-(lower alkoxy)cyclohexanols by dehydrating the cyclohexanol in a solution of concentrated sulfuric acid in glacial acetic acid (1:4 by vol.

at room temperature for a period of time of a few minutes or until solution is complete. The cyclohexene is recovered by drowning the reaction mixture in water, extracting the product with diethyl ether, and purifying the thus obtained 1-(4'-trifluoromethylphenyl)-4-(lower alkoxy)-1-cyclohexene by distillation under reduced pressure. The 1-(4'-trifluoromethylphenyl)-4-(lower alkoxy) cyclohexanols, in turn, may be readily prepared by the condensation of an appropriate 4-(lower alkoxy)cyclohexanone with the Grignard reagent prepared from p-trifluoromethylbromobenzene. This condensation reaction is carried out under the usual Grignard conditions and the cyclohexanol products are isolated in a standard manner and purified by distillation under reduced pressure.

In accordance with the present invention, the aromatization of the 1-(4'-trifluoromethylphenyl)-4-(lower alkoxy)-1-cyclohexenes to the corresponding 4-(lower alkoxy) 4'-trifluoromethylbiphenyls may be accomplished by one of the following three methods. In the first method, a mixture of the 1-(4'-trifluoromethylphenyl)-4-(lower alkoxy)-1-cyclohexene and a noble metal aromatization catalyst in a high boiling inert solvent is refluxed for a period of time of from about 2 hours to about 2 days; preferably about 12 hours. The noble metal aromatization catalyst may be finely divided platinum, palladium, rhodium or ruthenium. The noble metal catalysts are advantageously employed on a carrier such as finely divided alumina, activated charcoal, diatomaceous earth, etc., in which form they are commonly available. Typical such catalyst-on-carrier combinations which may be used are 5–10% palladium-on-carbon, 5–10% platinum-on-charcoal, 5–10% palladium-on-alumina, 5% ruthenium-on-carbon, 5–10% rhodium-on-carbon, 5–10% rhodium-on-alumina, and the like. The amount of catalyst-on-carrier employed may be from about 0.20 gram to about 0.50 gram per gram of the cyclohexene starting material used; preferably about 0.30–0.40 gram per gram of cyclohexene employed. Suitable high boiling inert solvents which may be employed are, for example, Decalin, nitrobenzene, toluene, xylene, chlorobenzene, diethylformamide, diphenyl ether, ethylbenzene, Tetralin, diethyl maleate, diethyl phthalate, and the like, or mixtures thereof.

In the second method, a mixture of the 1-(4'-trifluoromethylphenyl)-4-(lower alkoxy)-1-cyclohexene and an N-halosuccinimide, such as N-chlorosuccinimide or N-bromosuccinimide, in an inert halogenated hydrocarbon solvent is refluxed for a period of time of from about 8 hours to about 24 hours or more; preferably about 16 hours. The amount of N-halosuccinimide employed may be from about 1.0 gram to about 2.0 grams per gram of the cyclohexene starting material used; preferably about 1.5 grams per gram of cyclohexene employed. Suitable inert halogenated hydrocarbon solvents which may be employed are, for example, chloroform, 2,2-dichloropropane, 1,1,1-trichloroethane, carbon tetrachloride, ethylene chloride, 1-bromo-1-chloroethane, methylene bromide, and the like, or mixtures thereof.

In the third method, a mixture of the 1-(4'-trifluoromethylphenyl)-4-(lower alkoxy)-1-cyclohexene and chloranil in a high boiling inert solvent is refluxed for a period of time of from about 8 hours to about 24 hours or more; preferably about 16 hours. The amount of chloranil employed may be from about 1.0 gram to about 3.0 grams per gram of the cyclohexene starting material used; preferably about 2.0 grams per gram of cyclohexene employed. Suitable high boiling inert solvents which may be employed are, for example, Decalin, nitrobenzene, toluene, xylene, chlorobenzene, diethylformamide, diphenyl ether, ethylbenzene, Tetralin, diethyl maleate, diethyl phthalate, and the like, or mixtures thereof.

In each of the three methods set forth above, the 4-(lower alkoxy-4'-trifluoromethylbiphenyl product is isolated by first filtering the reaction mixture and then removing the solvent from the filtrate by distillation in vacuo. The residual product may then be purified by recrystallization from a mixed solvent system such as diethyl ether-petroleum ether.

The 4-(lower alkoxy)-4'-trifluoromethylbiphenyls, the products of the novel processes of the present invention, may be readily converted to 4-hydroxy-4'-trifluoromethylbiphenyl upon treatment with 48% hydrobromic acid in glacial acetic acid at the reflux temperature for a period of time of from about 4 hours to about 24 hours or so. The 4-hydroxy-4'-trifluoromethylbiphenyl may be readily converted to 4-tertiary aminoalkoxy-4'-trifluoromethylbiphenyls, which are potent hypocholesteremic agents, by the interaction of the sodium or potassium salt of 4-hydroxy-4'-trifluoromethylbiphenyl with an appropriately substituted teriary aminoalkyl halide as set forth in greater detail in U.S. Pat. No. 3,375,256 to Bach et al.

The invention will be described in greater detail in conjunction with the following specific examples.

EXAMPLE 1

Preparation of 4-methoxycyclohexanol

A solution consisting of 67 g. of p-methoxyphenol in 200 ml. of absolute ethanol was reduced at room temperature over approximately 0.8–1.0 g. of 5% rhodium-on-alumina catalyst; starting pressure 50 p.s.i. of hydrogen. After a quantitative volume of hydrogen was taken up, the solution was filtered, concentrated to a brown oily residue and distilled under reduced pressure. The 4-methoxycyclohexanol was collected at 57–58° C. (0.3–0.4 mm.).

EXAMPLE 2

Preparation of 4-methoxycyclohexanone

A solution of 52 g. of 4-methoxycyclohexanol in 170 ml. of acetone was added dropwise with vigorous stirring to a solution of chromium trioxide in sulfuric acid (28 g. dissolved in 23 ml. of conc. sulfuric acid and 90 ml. of water) cooled to −20° C. After 4 hours the reaction mixture was subjected to a liquid-liquid extraction (100 g. of sodium chloride was added to the reaction mixture prior to extraction) using approximately one liter of diethyl ether. After drying over anhydrous sodium sulfate, the ether extract was concentrated to a mobile brown oil which was fractionated in vacuo. The 4-methoxycyclohexanone was collected at 54–57° C. (0.6 mm.).

EXAMPLE 3

Preparation of 1-(4'-trifluoromethylphenyl)-4-methoxycyclohexanol

To 17 g. of magnesium suspended in 200 ml. of dry diethyl ether was added 157 g. of p-bromobenzotrifluoride and 1.5 g. of methyl iodide dissolved in approximately 200 ml. of dry diethyl ether under the usual Grignard conditions. Addition of the aromatic halide was regulated to maintain a gentle reflux and refluxing was continued for about one hour after addition was complete. While the freshly formed Grignard solution was still warm, 64 g. of 4-methoxycyclohexanone in 75 ml. of dry diethyl ether was added with vigorous stirring. The suspension was refluxed for an additional hour after the ketone addition and then decomposed in an excess of cold, aqueous ammonium chloride solution (53 g. in one liter of water). Three 100-ml. portions of diethyl ether were used to remove the organic material and the combined extracts were decolorized using charcoal, dried over anhydrous sodium sulfate and concentrated under reduced pressure to a brown oil. Distillation of this material gave 95 g. of 1-(4'-trifluoromethylphenyl) - 4 - methoxy-cyclohexanol; B.P. 121–122° C. (0.4–0.5 mm.); M.P. 53–54° C.

EXAMPLE 4

Preparation of 1-(4'-trifluoromethylphenyl)-4-methoxy-1-cyclohexene

To a solution of 25 ml. of conc. sulfuric acid in 90 ml. of glacial acetic acid was added 51 g. of 1-(4'-trifluoromethylphenyl)-4-methoxycyclohexanol, swirled for approximately two minutes or until solution was complete, and then poured into a cold solution of sodium acetate (16 g. in 200 ml. of water) covered by a layer of 200 ml. of diethyl ether. The ether layer was collected, dried over anhydrous sodium sulfate, and concentrated to an oil which was distilled under reduced pressure. The 1-(4'-trifluoromethylphenyl)-4-methoxy-1-cyclohexene was collected at 104–105° C. (0.3–0.4 mm.).

EXAMPLE 5

Preparation of 4-methoxy-4'-trifluoromethylbiphenyl

To 30 ml. of Decalin were added 0.88 g. of 10% palladium-on-charcoal and 2.5 g. of 1-(4'-trifluoromethylphenyl)-4-methoxy-1-cyclohexene and the reaction mixture was refluxed for about four hours or until thin-layer chromatographic analysis indicated complete aromatization to the 4-methoxy-4'-trifluoromethylbiphenyl. Filtration of the reaction mixture and removal of the solvent from the filtrate afforded 2.2 g. of a colorless waxy solid which, after one recrystallization from a diethyl ether-petroleum ether solution, gave a pure sample of 4-methoxy-4'-trifluoromethylbiphenyl.

EXAMPLE 6

Preparation of 4-ethoxy-4'-trifluoromethylbiphenyl

By replacing the 1-(4'-trifluoromethylphenyl)-4-methoxy-1-cyclohexene employed in Example 5 with an equimolecular quantity of 1-(4'-trifluoromethylphenyl)-4-ethoxy-1-cyclohexene and following substantially the same procedure described in Example 5, there is obtained the 4-ethoxy-4'-trifluoromethylbiphenyl.

EXAMPLE 7

Preparation of 4-methoxy-4'-trifluoromethylbiphenyl

A suspension consisting of 51 g. of 1-(4'-trifluoromethylphenyl)-4-methoxy-1-cyclohexene and 71 g. of N-bromosuccinimide in 225 ml. of carbon tetrachloride was refluxed for 16 hours and then filtered. The clear filtrate was concentrated to a yellow waxy solid which was triturated with two 100-ml. portions of diethyl ether. This procedure yielded approximately 24 g. of 4-methoxy-4'-trifluoromethylbiphenyl, M.P. 110–115° C.

EXAMPLE 8

Preparation of 4-n-propoxy-4'-trifluoromethylbiphenyl

The procedure of Example 7 is repeated, substituting an equimolecular amount of 1-(4'-trifluoromethylphenyl)-4-n-propoxy-1-cyclohexene for the 1-(4'-trifluoromethylphenyl)-4-methoxy-1-cyclohexene employed in that example. There is thus obtained the 4-n-propoxy-4'-trifluoromethylbiphenyl.

EXAMPLE 9

Preparation of 4-isopropoxy-4'-trifluoromethylbiphenyl

A solution of 14 g. of 1-(4'-trifluoromethylphenyl)-4-isopropoxy-1-cyclohexene and 34 g. of chloranil in 100 ml. of toluene was refluxed for 18 hours. The precipitated tetrachlorohydroquinone was separated and concentration of the clear filtrate afforded the desired 4-isopropoxy-4'-trifluoromethylbiphenyl.

EXAMPLE 10

Preparation of 4-n-butoxy-4'-trifluoromethylbiphenyl

In place of the 1-(4'-trifluoromethylphenyl)-4-isopropoxy-1-cyclohexene of Example 9 there is employed an equimolecular quantity of 1-(4'-trifluoromethylphenyl)-4-n-butoxy-1-cyclohexene whereby the 4-n-butoxy-4'-trifluoromethylbiphenyl is obtained in equally good yield.

EXAMPLE 11

Preparation of 4-methoxy-4'-trifluoromethylbiphenyl

A mixture of 500 g. of 1-(4'-trifluoromethylphenyl)-4-methoxy-1-cyclohexene and 166 g. of 10% palladium-on-carbon in 2.5 liters of nitrobenzene was placed in a 12 l. 3-neck flask provided with a long wide condenser and a stirrer, and refluxed for 22 hours with nitrogen passing through the mixture. The reaction mixture was cooled to room temperature, diluted with about 1.5 liters of acetone and filtered through Celite®. The filter cake was washed a few times with boiling acetone. After combining the washings with the filtrate, the solvent was removed using a water aspirator and an approximately 12 inch Vigreux column. The residue solidified to give 442 g. (89.9% yield) of the desired product.

EXAMPLE 12

Preparation of 4-isobutoxy-4'-trifluoromethylbiphenyl

By replacing the 1-(4'-trifluoromethylphenyl)-4-methoxy-1-cyclohexene employed in Example 11 with an equimolecular quantity of 1-(4'-trifluoromethylphenyl)-4-isobutoxy-1-cyclohexene and following substantially the same procedure described in Example 11, there is obtained the 4-isobutoxy-4'-trifluoromethylbiphenyl.

EXAMPLE 13

Preparation of 4-methoxy-4'-trifluoromethylbiphenyl

A mixture of 154.6 g. of 1-(4'-trifluoromethylphenyl)-4-methoxy-1-cyclohexene and 15.5 g. of 10% palladium-on-carbon in 510 ml. of diethyl maleate was placed in a 3-neck flask equipped with a long condenser and a stirrer, and refluxed under nitrogen for 15 minutes. The reaction mixture was filtered. In the filtrate, a solid formed upon standing at room temperature which was removed by filtration, washed with petroleum ether, and dried to give 30.15 g. of 4-methoxy-4'-trifluoromethylbiphenyl, M.P. 119–121° C. This filtrate was concentrated in vacuo to a residue which upon recrystallization from about one liter of absolute methanol gave an additional 82.25 g. of product, M.P. 121–122° C.

EXAMPLE 14

Preparation of 4-tert.-butoxy-4'-trifluoromethylbiphenyl

The procedure of Example 13 is repeated, substituting an equimolecular amount of 1-(4'-trifluoromethylphenyl)-4-tert.-butoxy-1-cyclohexene for the 1-(4'-trifluoromethylphenyl)-4-methoxy-1-cyclohexene employed in that example. There is thus obtained the 4-tert.-butoxy-4'-trifluoromethylbiphenyl.

EXAMPLE 15

Preparation of 4-hydroxy-4'-trifluoromethylbiphenyl

A solution of 4-methoxy-4'-trifluoromethylbiphenyl in 48% hydrobromic acid (180 ml.) and glacial acetic acid (750 ml.) was refluxed 4 hours and then cooled to room temperature. After standing overnight the solution deposited needle crystals which were collected and added to the crystalline residue remaining after concentration of the filtrate. Two recrystallizations of the combined crude yields afforded the desired 4-hydroxy-4'-trifluoromethylbiphenyl (M.P. 145–147° C.)

EXAMPLE 16

Preparation of 4-(2-pyrrolidinoethoxy)-4'-trifluoromethylbiphenyl

Twenty four grams of 4-hydroxy-4'-trifluoromethylbiphenyl was dissolved in 200 ml. of dry N,N-dimethylformamide and heated with 2.4 g. of sodium hydride added portionwise over a period of twenty minutes. To the sodio derivative formed in this manner was added 14 g. of N,N-diethyl-2-chloroethylamine in 50 ml. of dry ether. The combined solutions were refluxed 15 hours and then filtered to remove precipitated sodium chloride. Removal of the solvents left a semi-solid residue which was triturated with two 100-ml. portions of warm water and then taken up in 200 ml. of diethyl ether. The ether solution was decolorized using charcoal, dried over anhydrous sodium sulfate, and treated with an excess of diethyl ether saturated with dry hydrogen chloride. The finely divided hydrochloride was collected on a filter plate, triturated using two 50-ml. portions of dry diethyl ether and then suspended in an excess of ammonium hydroxide solution. The organic base was collected by filtration and recrystallized twice from an acetone-water solution yielding ca. 20 g. of the desired 4-(2-pyrrolidinoethoxy)-4'-trifluoromethyl biphenyl, M.P. 108–110° C.

What is claimed is:

1. The process of preparing compounds of the formula:

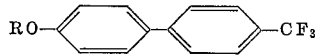

wherein R is lower alkyl which comprises aromatizing a compound of the formula:

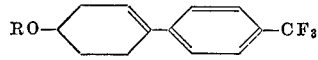

wherein R is lower alkyl with a noble metal aromatization catalyst in a high boiling inert solvent system at the reflux temperature for a period of time of from about 2 hours to about 2 days, and recovering the formed product from the reaction mixture.

2. A process according to claim 1 wherein R is methyl, the catalyst is 10% palladium-on-carbon, and the solvent system is Decalin.

3. A process according to claim 1 wherein R is methyl, the catalyst is 10% palladium-on-carbon, and the solvent system is nitrobenzene.

4. A process according to claim 1 wherein R is methyl, the catalyst is 10% palladium-on-carbon, and the solvent system is diethyl maleate.

5. A process according to claim 1 wherein R is ethyl, the catalyst is 10% palladium-on-carbon, and the solvent system is a mixture of nitrobenzene and diethyl maleate.

References Cited

Wagner et al., Synthetic Organic Chemistry (1965), pp. 3–5.

BERNARD HELFIN, Primary Examiner

U.S. Cl. X.R.

260—326.8, 620